Figure 1:
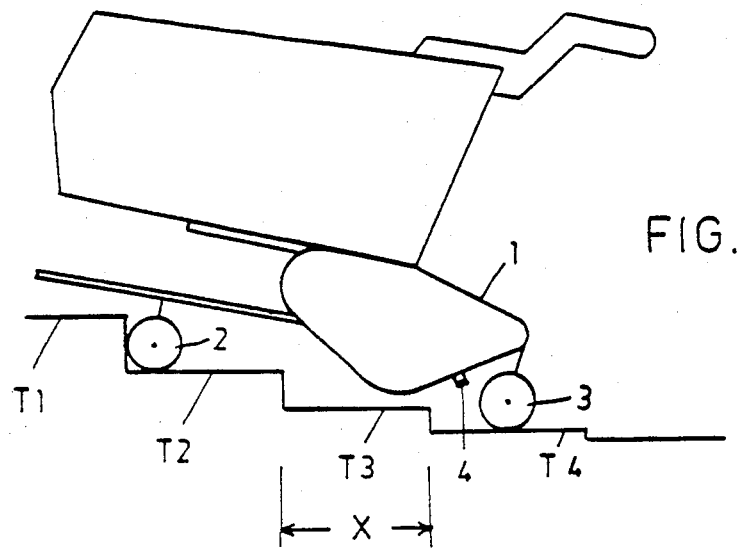

United States Patent [19]

Karpisek

[11] Patent Number: 4,639,002
[45] Date of Patent: Jan. 27, 1987

[54] WHEELED TROLLEY FRAME

[76] Inventor: Ladislav S. Karpisek, 86 Woodfield Blvde., Caringbah/Sydney, Australia, 2229

[21] Appl. No.: 751,742
[22] PCT Filed: Sep. 14, 1984
[86] PCT No.: PCT/AU84/00181
 § 371 Date: May 13, 1985
 § 102(e) Date: May 13, 1985
[87] PCT Pub. No.: WO85/01259
 PCT Pub. Date: Mar. 28, 1985

[30] Foreign Application Priority Data

Sep. 14, 1983 [AU] Australia .............................. PG1400

[51] Int. Cl.[4] .............................................. B62B 5/02
[52] U.S. Cl. .................................................. 280/5.2
[58] Field of Search .................. 280/5.2, 5.32, 5.3, 280/5.24

[56] References Cited

FOREIGN PATENT DOCUMENTS 157653 7/1952 Australia .
163608 2/1954 Australia .
2030594 12/1971 Fed. Rep. of Germany .
2038149 2/1972 Fed. Rep. of Germany .
2144803 3/1973 Fed. Rep. of Germany .
466722 1/1969 France .
840771 7/1952 United Kingdom .

Primary Examiner—John A. Pekar
Attorney, Agent, or Firm—Anthony A. O'Brien

[57] ABSTRACT

A wheeled trolley frame for use on an escalator. The frame has two ends and two pairs of ground engaging wheels (2 and 3) respectively positioned one pair adjacent each frame end and spaced apart so that both pairs of wheels cannot sit on a single escalator step tread. First and second escalator tread engaging means (4 and 5) on the frame respectively positioned adjacent the wheel pairs and intermediate the wheel pairs. The tread engaging means are spaced apart so that they cannot rest on the same escalator tread and lie above ground level and are spaced therefrom by a distance such that they will when the trolley frame is mounted on a formed escalator engage on two treads of the escalator and maintain the wheels adjacent the tread engaging means elevated from the escalator step treads.

4 Claims, 7 Drawing Figures

WHEELED TROLLEY FRAME

This invention relates to trolleys of the type used to transport goods, examples are supermarket trolleys and luggage trolleys as used in airports.

With the advent of multi-story shopping centres and airports escalators have been introduced with a view to facilitating the transport of persons from floor to floor. Ramps have been installed in many multi-story buildings to enable persons to move trolleys from floor to floor. So as to facilitate the movement of trolleys up the ramps the inclines have been carefully designed but even so there is a reluctance by persons to push a loaded trolley up a ramp. Because of this it has become common for persons to limit their purchases in shopping centres to floors where they can have immediate access to carparking facilities and by so doing avoid the above problem.

To counter this practice multi-story car parks have been built alongside multi-story shopping centres so persons so inclined can park adjacent the floor where they will be making their purchases and transporting them in a shopping trolley. This however leaves the older and less well designed shopping centres with the problem of how to easily transport trolleys from floor to floor. In many shopping centres person conveying escalators are installed but trolleys have not hitherto been designed for use with such escalators. This invention provides improvements in trolleys which will allow them to travel safely with the user on the escalator from floor to floor.

The present invention can be broadly said to comprise a wheeled trolley frame for use on an escalator, said frame having two ends and two pairs of ground engaging wheels respectively positioned one pair adjacent each frame end and spaced apart so that both pairs of wheels cannot sit on a single escalator step tread, an escalator tread engaging means on the frame positioned adjacent one of the wheel pairs and intermediate the wheel pairs, the tread engaging means lies above ground level and is spaced therefrom by a distance such that it will when the trolley frame is mounted on a formed escalator engage on a step tread of the escalator and maintain the wheels adjacent the tread engaging means elevated from the escalator step tread.

Figure 2:
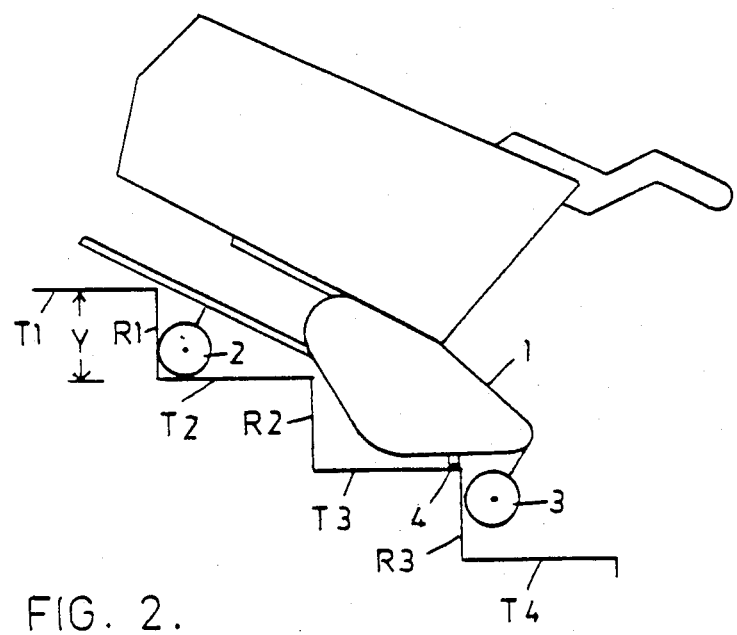
Figure 3:
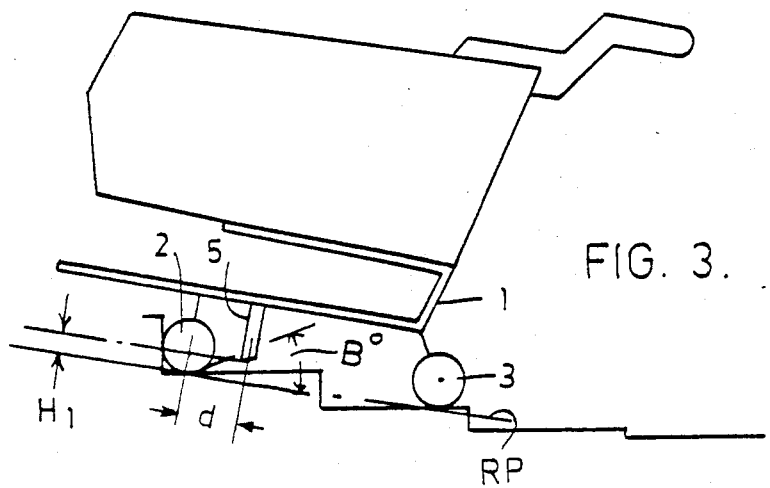
Figure 4:
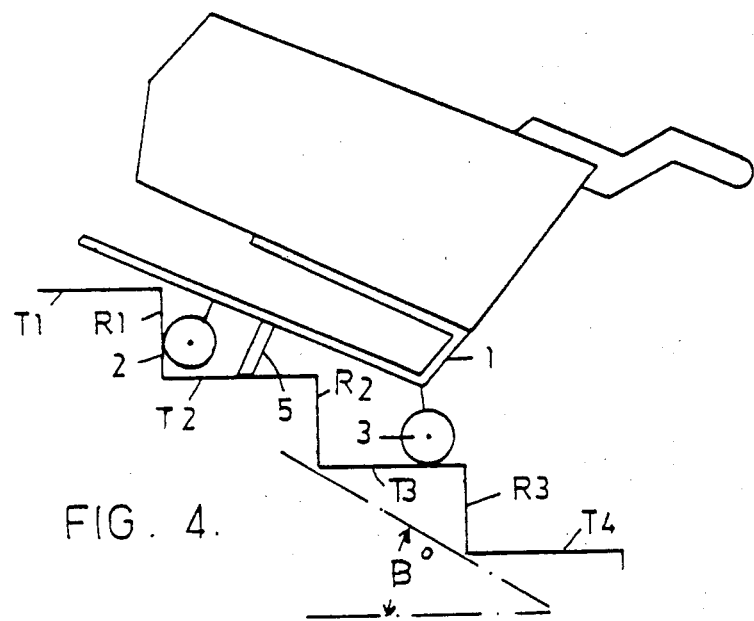
Figure 5:
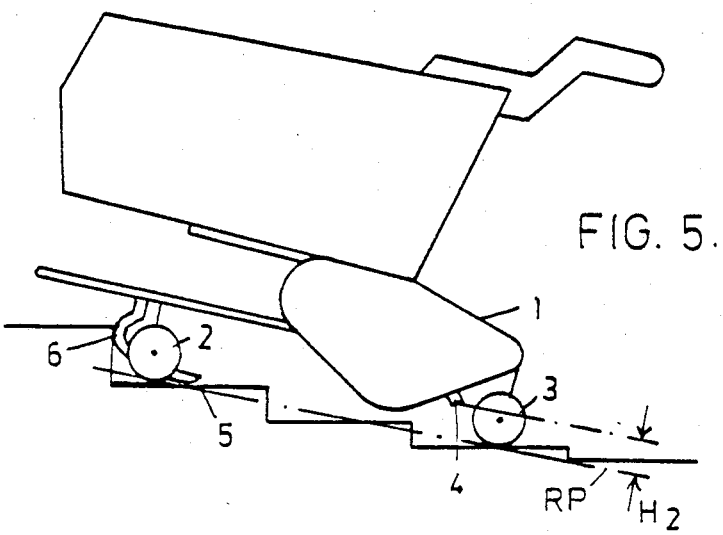
Figure 6:
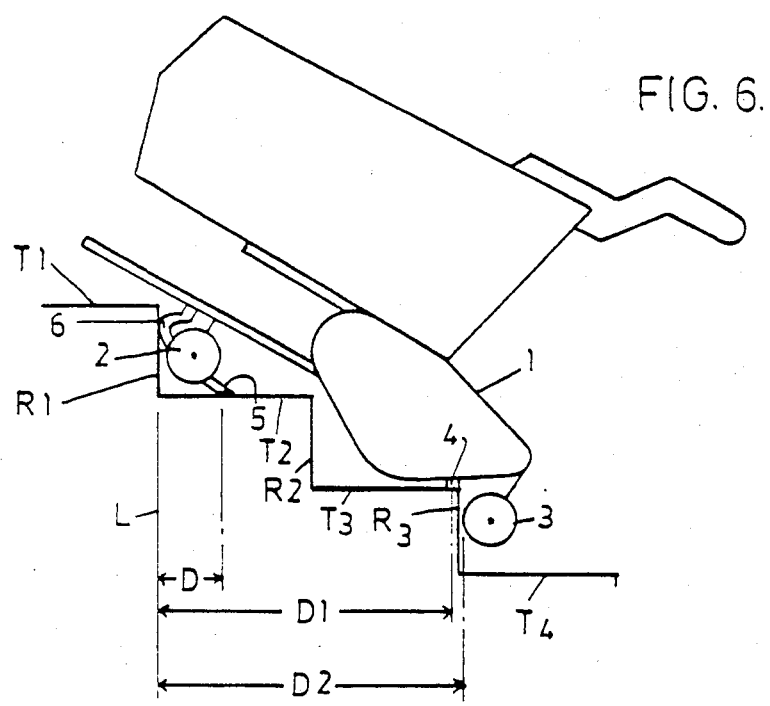
Figure 7:
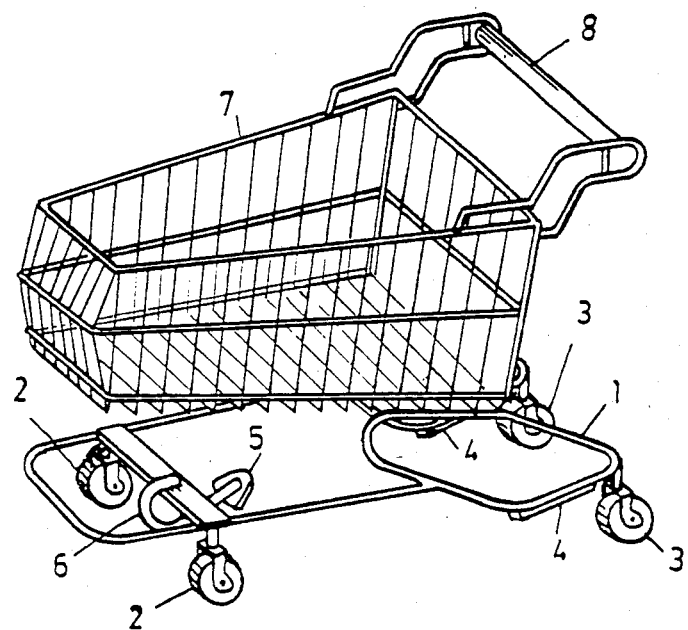

Several presently preferred embodiments of the invention will now be described with reference to the accompanying drawings in which:

FIG. 1 is a schematic elevation of a shopping trolley made according to one embodiment of the invention when entered onto an escalator as the steps are about to form, FIG. 2 is a view similar to FIG. 1 after the escalator steps have formed, FIG. 3 is a view similar to FIG. 1 of a second embodiment of the invention, FIG. 4 is a view similar to FIG. 3 after the escalator steps have formed, FIG. 5 is a view similar to FIG. 1 of a third embodiment of the invention, FIG. 6 is a view similar to FIG. 5 after the escalator steps have formed, and FIG. 7 is a perspective elevation of the trolley of FIG. 3 showing details of the construction.

In the drawings there is shown a shopping trolley by way of example but the invention is applicable to other forms of trolleys such as low level platform luggage trolleys as used in airports. For this reason the invention can be considered as being directed to a wheeled trolley frame on which goods supporting attachments, such as a basket, can be secured. As illustrated the trolley frame 1 of FIG. 1 has a front pair of wheels 2 and a rear pair of wheels 3. On the frame 1 adjacent the rear wheels 3 there are support members 4, one adjacent each rear wheel 3 and they are elevated a small distance above a common plane on which all four wheels would normally rest if the frame was not on the escalator. The escalator section shown includes five treads T1, T2, T3, T4, and T5 separated by risers R1, R2 and R3 (see FIG. 6).

The tread widths are the same and for the purposes of later explanation will be considered as being equal to X. It will be noted from FIGS. 1,3 and 5 that the pitch of the wheel pairs is such that when the wheels 2 on the tread T2 abut the riser R1 the rear wheels 3 are on tread T4 with the support member above the tread T3.

From FIG. 2 it will be seen that as the escalator steps fully form by the treads T1 to T3 rising relative to the tread T4 the tread T3 comes into contact with the support members 4 of FIG. 1 and the wheels 3 are raised clear of the tread T4. The trolley frame will travel in this manner safely supported on its two front wheels 2 and the two supports 4 until the escalator steps begin to unform at the end of the escalator travel at which time the reverse procedure will occur. More specifically, the treads T2 to T4 will rise relative to the tread T1 and the wheels 3 will be engaged to cause the supports 4 to disengage with the tread T3.

FIGS. 3 and 4 illustrate a similar set of circumstances showing a trolley frame 1 on which there is a single or a double support means 5. The support means 5 preferable includes a forwardly projecting travel limiting stop 6 to engage against the riser R1. The pitch between the wheels 2 and 3 in this embodiment has been shortened only because of the shape of the trolley frame. If desired the trolley frame can be modified to allow the wheels 3 to rest upon the tread T4 rather than the tread T3. This arrangement however could result in a severe slope for the trolley frame with the centre of gravity of a load in the basket disposed too far to the rear and for the reason it is proposed to have the arrangement as illustrated.

FIGS. 5 and 6 show a trolley frame having the features of FIGS. 1 and 3 and is the preferred arrangement in that the trolley frame is supported off all wheels 2 and 3. As will be seen from FIGS. 5 and 6 the trolley frame is supported on both the support means 4 and 5 on adjacent escalator treads T2 and T3.

The presently preferred trolley frame and basket is shown in the perspective view of FIG. 7 where a wire basket 7 with associated handle 8 is secured to the frame 1. The support member 5 is shown fixed to a curved bar providing the forward movement limiting means 6 but it is to be understood that the bar 6 is optional as the wheels 2 can be used in place of the bar 6. It will be appreciated however that for practical reasons the bar 6 is preferred. The wheels 2 and 3 are shown as castering wheels which is the preferred form to faciltate the wheeling of the trolley.

The member 5 can be pivotally connected to the bar 6 to allow minor adjustments of angle to occur to facilitate the largest possible surface contact of the foot 5 with the escalator tread with which it is engaged. Pivoting also allows the foot 5 to swing up to pass over obstructions such as speed humps on roadways and parking areas.

The support means 4 are enlongated members fixed to the frame 1 and the supports 4 and 5 are preferably covered with rubber or like high-grip material.

To provide workable embodiments of the invention certain operating and constructional criteria must be observed. For example it is a fundamental requirement that in loading the trolley frame onto an escalator that the frame be advanced until the wheels 2, in the FIGS. 1 and 2 embodiment, or the travel limiting stop 6, in the other embodiments, be engaged against a riser R. This positions the other components such as the wheels 3 and the support means 4 and/or 5 in the correct positions for the successful support of the trolley frame on the escalator. For example the supports 4 and/or 5 must lie intermediate the wheel pairs 2 and 3.

By way of explanation of a preferred arrangement reference will be made now to FIG. 6 where a datum line L is provided and the positionings of the components are referred thereto. The discussion relates to a trolley frame when positioned on a fully formed escalator. Distance D and D1 from the end of the member 6 where it engages the riser R1 and the contact point of 5 with the treat T2 and the contact point of 4 with T3 should not result in the members 5 and 4 resting on the rear edges of the steps where the risers and the treads intersect at the points R2,T2 and R3,T3, otherwise an unstable situation could result. The distance D2 should not be such as to result in the wheel 3 bearing on the tread rear edge R3,T3 for fear that the angle of the trolley and the weight thereof would overcome the frictional grip between the member 5 and the tread T2 and cause the wheels 3 to drop off the edge R3,T3 towards the tread T4 creating a space between the riser R1 and the member 6. From a theoretical standpoint however this would be acceptable provided that the rearward movement did not result in the members 5 and 4 moving rearwardly beyond the edges R2,T2 and R3,T3 as an unstable condition could then occur, but they could rest on those edges.

In view of the foregoing the theoretical conditions to be met are as follows. For all forms of the invention the support means for the trolley frame on the escalator is/are intermediate the wheel pairs. For the FIGS. 3–4 and FIGS. 5–6 embodiments the distance D is less than $X-a$ (i.e. $D<X-a$) where X is the width in the operating direction of the escalator steps and $0<a<r$ and r is the radius of the wheels 3, where naturally X is greater than 2r. The distance D1 is greater than nX and is less than $(n+1)X-a$, (i.e. $nX<D1<(n+1)X-a$) where n is a whole number equal to or greater than 1. The distance D2 is greater than $(n+1)X-a$, (i.e. $D>(n+1)X-a$).

The foregoing parameters if complied with will ensure that should the trolley move backwardly because of engagement of wheels 3 with the edge R3,T3 the member 4 will seat on a tread other than that above which the wheels 3 will be positioned and that the member 5 will remain on the tread over which the wheel 2 is positioned. In practice all of the foregoing would be taken into account when the distances D to D3 were being designed and a margin for safety above the pure theoretical consideration would be allowed. For example the distances D and D1 could be reduced by an amount sufficient to ensure the majority of the seating surfaces of the members 5 and 4 would be resting on the treads T2 and T3 for the condition where the wheels 3 were peripherally abutting the riser R3.

As for the height H1 of the contact point of 5 above a reference plane on which all four wheels 2 and 3 will rest this is related to the escalator operating angle. Assuming the escalator angle is B degrees then, referring to FIG. 3, if the contact point of member 5 lay on or above a line tangent to the wheel 2 at an angle B to the horizontal (the assumed reference plane) then when the trolley frame was on the fully formed escalator of FIG. 4 or 6 the wheel 2 and the member 5 would be both resting on tread T2 which is not the required arrangement where the member 5 engages and the wheel 2 does not engage. In view of this the contact point of 5 must be no lower than the reference plane RP of FIGS. 3 and 5, otherwise it would prevent the trolley frame from moving on its wheels, and no higher than the tangent to the wheels 2 at an angle to the reference plane equal to the escalator operating angle of B. From FIG. 3 it will be seen that the maximum height is therefore d tan B degrees.

As for the height H2 of the contact point of 4 above the reference plane RP this must be less than the height Y of the riser R3, otherwise the wheels 3 will not be raised from the tread T4 and naturally the contact point of 4 cannot be lower than the reference plane RP.

With the embodiment of FIGS. 1 and 2 the requirements for D1, D2 and H2 would apply as they do to the FIGS. 5 and 6 arrangement and D would not apply. With the FIGS. 3 and 4 embodiment the requirement for D and H1 would apply but D1 would not apply and D2 would be such as to ensure that the the wheels 3 are on a tread other than that on which wheels 2 are supported.

What is claimed is:

1. A wheeled trolley frame for use on an escalator, four ground engaging wheels comprising a pair of wheels adjacent each of two ends of the frame, said wheel pairs being spaced to thereby prevent the wheel pairs from not only sitting upon a single tread of a step of an escalator but also on the treads of two consecutive steps of an escalator, positioning means on the frame adjacent the first pair of wheels, an abutment face on said positioning means extending beyond the first pair of wheels adapted to engage the riser of a formed escalator step preceding the escalator step over which the first pair of wheels is positioned, a first escalator tread enagaging member on the frame located between the pairs of wheels and between the wheels of the first pair of wheels and vertically spaced above a ground plane on which all of the wheels would normally rest, a pair of second escalator tread engaging means mounted on the frame between the pairs of wheels and respectively adjacent the wheels of the second pair of wheels and vertically spaced above the ground plane, the first and second escalator tread engaging members providing a three point support for the frame when mounted on a formed escalator, said first and second escalator tread engaging members being respectively spaced from the abutment face of the positioning means by predetermined distances, whereby when the frame is on a formed escalator with the abutment face engaging a step riser preceding a first escalator tread the first tread engaging member bears on the first escalator tread and the first pair of wheels are positioned above and spaced from the first escalator tread and the second tread engaging members bear on the following second escalator tread and the second pair of wheels overlie the following third escalator tread and spaced therefrom.

2. A wheeled trolley frame as claimed in claim 1 wherein the first escalator tread engaging member is a foot mounted on the positioning means.

3. A wheeled trolley as claimed in claim 2 wherein the foot is pivotally mounted on the positioning means.

4. A wheeled trolley as claimed in claim 1 wherein the second tread engaging members having elongated support surfaces which bear on the second tread when the frame is mounted on a formed escalator.

* * * * *